United States Patent
Taylor et al.

(10) Patent No.: US 10,603,750 B1
(45) Date of Patent: Mar. 31, 2020

(54) MOUNTING SYSTEM WITH SELF ALIGNING CAM SYSTEM

(71) Applicant: Jergens, Inc., Cleveland, OH (US)

(72) Inventors: Darel R. Taylor, Painesville, OH (US); Terry Schron, Garden Grove, CA (US); Edward Conaway, Twinsburg, OH (US)

(73) Assignee: Jergens, Inc., Cleveland, OH (US)

( * ) Notice: Subject to any disclaimer, the term of this patent is extended or adjusted under 35 U.S.C. 154(b) by 238 days.

(21) Appl. No.: 15/944,516

(22) Filed: Apr. 3, 2018

Related U.S. Application Data

(60) Provisional application No. 62/481,356, filed on Apr. 4, 2017.

(51) Int. Cl.
 *B25B 1/22* (2006.01)
 *B23Q 1/28* (2006.01)
 *B23Q 3/10* (2006.01)
 *F16B 5/00* (2006.01)
 *B23Q 16/00* (2006.01)

(52) U.S. Cl.
 CPC .............. *B23Q 1/28* (2013.01); *B23Q 3/103* (2013.01); *B23Q 16/00* (2013.01); *F16B 5/0004* (2013.01)

(58) Field of Classification Search
 USPC .................. 269/74, 289 R, 309, 346.03, 900
 See application file for complete search history.

(56) References Cited

U.S. PATENT DOCUMENTS

| | | | |
|---|---|---|---|
| 2,707,419 A | 5/1955 | Schron | |
| 4,881,727 A | 11/1989 | Nemirovsky | |
| 4,932,295 A | 6/1990 | Erickson | |
| 5,167,405 A | 12/1992 | Cayley, Jr. | |
| 5,288,182 A | 2/1994 | Patterson et al. | |
| 5,308,050 A | 5/1994 | Schroeder | |
| 6,308,050 B1 * | 10/2001 | Eklof | ................... H04B 1/0082 455/260 |
| 6,349,929 B1 | 2/2002 | Speltz et al. | |
| 7,425,000 B2 | 9/2008 | Stark | |
| 7,520,495 B2 | 4/2009 | Stark | |
| 7,654,285 B2 | 2/2010 | Stark | |
| 7,748,690 B2 | 7/2010 | Stark | |
| 8,534,658 B2 | 9/2013 | Schron et al. | |
| 8,585,031 B2 | 11/2013 | Stark | |

(Continued)

FOREIGN PATENT DOCUMENTS

DE    102009009212 B3    6/2010

OTHER PUBLICATIONS

Jergens, Inc.; "Ball Lock Mounting System"; pp. 1.4-1.21.
Espacenet Bibliographic data:DE 102009009212 (B3), Published Jun. 24, 2010, 1pg.

*Primary Examiner* — Joseph J Hail
*Assistant Examiner* — Shantese L McDonald
(74) *Attorney, Agent, or Firm* — Rankin, Hill & Clark LLP

(57) ABSTRACT

A mounting system having a dual plunger arrangement wherein the side of each plunger has a pull down cam to provide a desired pull down action in relation to at least two studs, the cams moving relative to one another and axially aligning relative to one another relative to the two axially spaced pull down studs to allow the plungers to provide a maximum hold down force for the two pull down studs, balance the hold down forces thereby maximizing performance and reducing unlocking forces.

14 Claims, 9 Drawing Sheets

(56) References Cited

U.S. PATENT DOCUMENTS

| | | | |
|---|---|---|---|
| 8,708,323 B2 * | 4/2014 | Hoyt | B23Q 3/103 |
| | | | 248/346.03 |
| 8,727,329 B2 | 5/2014 | Schron et al. | |
| 2004/0256780 A1 | 12/2004 | Lang | |
| 2007/0063405 A1 | 3/2007 | Troxler | |
| 2008/0174077 A1 * | 7/2008 | Lang | B25B 1/103 |
| | | | 279/121 |
| 2010/0316439 A1 | 12/2010 | Schron et al. | |
| 2013/0043634 A1 | 2/2013 | Kitaura et al. | |

\* cited by examiner

MOUNTING SYSTEM WITH SELF ALIGNING CAM SYSTEM

This application claims priority to provisional patent application Ser. No. 62/481,356 filed on Apr. 4, 2017 which is incorporated by reference herein.

This invention of this application relates generally to the art of mounting systems and, more particularly, to a mounting system used as a quick-change mounting and locating system for tooling and the like.

Mounting systems are known in the art and have been used over the years to accurately mount one structure to a substrate structure. With respect to the invention of this application, it has been found that the mounting systems work particularly to accurately mount a workholding device onto a subplate wherein the subplate can be fixed relative to a machining table. Thus, this application will be described with reference to these structures, but has broader application wherein this description should not be limiting in nature.

INCORPORATION BY REFERENCE

Quick-change tooling and mounting systems have been used over the years and come in many forms wherein some of these forms are simple designs while others are more complex. These prior systems are hereby incorporated by reference into this application and form part of this specification. Many of these systems have been around for a number of years such as U.S. Pat. No. 2,707,419, to Schron which discloses a system for locating a fixture plate. U.S. Pat. No. 4,932,295 to Erickson discloses an automatic clamping unit for receiving and holding a tool holder. These systems have been improved over the years and these improvements include JERGENS' BALL LOCK and DROP&LOCK mounting systems which are quick change system for mounting one structure to another structure wherein attached are printouts disclosing this system. Further U.S. Pat. Nos. 8,534,658 and 8,727,329 to Schron discloses a mounting system for joining a fixture plate to a subplate and the like. Again, all of these devices and patents are incorporated by reference into this application and form part of this specification.

The above referenced systems have been found to be very effective in this art, but relate to a mounting system that has individual locking shanks wherein each shank must be secured individually. Over the years, these systems have been improved wherein U. S. Publication No. 2004/0256780 to Lang discloses a jig which can be precisely repositioned. U.S. Pat. No. 5,167,405 to Cayley. Jr. discloses a fast change set-up device for work on work support. U.S. Pat. No. 4,881,727 to Newirovsky discloses a clamping mechanism. U. S. Publication No. 2008/0174077 to Lang discloses a self-centering chuck. Further, Midaco Corporation sells a Micro Pallet System MPS for work holding wherein the attached printouts of this system are attached. Again, all of these referenced devices, patents and applications are hereby incorporated by reference into this application and form part of this specification.

U.S. Pat. No. 8,708,323 to Hoyt et al. discloses a mounting system and is also incorporated by reference herein and a copy is attached hereto wherein it forms part of the specification of this application.

BACKGROUND OF THE INVENTION

Again, the invention of this application relates to mounting system and will be described in connection with fixture plates and subplates; however, the invention of this application has a much broader application and can be used in connection with a wide range of quick-change systems and even long-term mounting systems. Mounting systems have been used over the years for a wide range of applications and can be used to quickly and accurately locate and lock a fixture plate or other workholding device to a subplate. Further, additional mounting and/or positioning structures can be used in connection with the workholding system. The above referenced patents, applications and devices show a progression in the art which as led to the invention of this application.

More particularly, it has been found that the LANG workholding system provided improvements in the art for locating and holding a fixture plate to a subplate.

However, it has also been found that the LANG system has deficiencies and inefficiencies. In particular, and with reference to U. S. Publication No. 2004/0256780 and U. S. Publication No. 2008/0174077 both to Lang, the mounting systems utilize the ends of the clamping plungers to engage his positioning pins. One of these problems is that this design requires a plunger for each positioning pin. Further, by utilizing the end of the plunger for the hold-down engagement, the camming angles of the system can be to great thereby increasing the force needed to provide the desired hold-down forces and/or increasing the pin diameter of the positioning pins. These conditions adversely affect the cost of the mounting system and the overall performance of the system. Further, it increases the number of parts and machining operations needed to produce the system which can result in quality issues. As a result, these systems can be expensive and they can produce machining variations in operation. Similarly, U.S. Pat. No. 5,167,405 to Cayley. Jr. and U.S. Pat. No. 4,881,727 to Newirovsky use the end of the clamping plungers to engage the positioning pins. As can be seen by all of these discloses, these mounting systems include many parts and require many complex machining operations to produce.

U.S. Pat. No. 8,708,323 to Hoyt et al. overcame many of the problems in the art and represents a significant improvement in the art.

SUMMARY OF THE INVENTION

In accordance with the present invention, provided is a mounting system that has the useful benefits of the prior art mounting systems but which overcomes many of the shortcomings in these prior art systems. More particularly, provided is a mounting system for securing a fixture plate or work holding device to a subplate which both locates the workholding device and which provides significant clamping forces to vastly reduce machining variations. Further, the system of this application is a quick change system and can be used with a wide variety of workholding devices and elements and can be used in connection with a wide range of machining equipment.

More particularly, the mounting system according to the present invention includes a dual cam system wherein the cams of the plunger(s) are each utilized to engage a separate pull down stud wherein the cams are self aligning relative to one another to provide maximum hold down force for the pull down stud with the high cost of close tolerance machining. Accordingly, the dual cam system of this application can balance forces, improve performance and reduce costs.

According to one set of embodiments, provided is a mounting system having a dual plunger arrangement wherein the side of each plunger has a pull down cam to provide a desired pull down action in relation to at least two studs, the cams moving relative to one another and axially aligning relative to one another relative to the two axially spaced pull down studs to allow the plungers to provide a maximum hold down force for the two pull down studs, balance the hold down forces thereby maximizing performance and reducing unlocking forces.

According to this set of embodiments, provided is a mounting system for supporting a workholding device having a base block with a block bottom and a block top with at least one side block surface between the block bottom and top. The base block further includes a plunger passage and first and stud passages and the plunger passage extends into the base block from the at least one side surface and extends inwardly along a plunger axis. The stud passages extend into the base block from one of the block bottom and the block top along first and second stud axis and the stud axes being generally parallel to one another and transverse to the plunger axis. The stud axes being radially spaced from the plunger axis. The stud passages intersecting the plunger passage in spaced first and second locking regions. The system further includes a dual plunger arrangement having both a first plunger extending along the plunger axis and a second independent plunger extending along the same plunger axis. Each of the first and second plungers having an inner end and an outer end and each having an outer plunger surface between the ends that are at least partially shaped to be received in the plunger passage such that the plungers move axially along the plunger axis in a locking motion toward and away from one another between an unlocked condition and a locked condition. Each plunger further including a radially extending pocket or clearance with a pull down cam and an axially spaced clearance slots.

The system further including a first and a second pull down stud shaped to be received, respectively, in the first and second stud passages and the studs being connectable with an associated workholding device and extending between a stud inner end and a stud outer end along a stud axis. The studs each having a locking groove between the stud ends. The clearance slot of each plunger allowing the corresponding stud groove to enter the corresponding locking region. Once the studs are in their respective locking region, axial movement of the plungers along the plunger axis engages the pull down cam against the stud grooves thereby urging the studs into the stud passages and providing the hold-down force for securing the associated workholding device relative to the base block. In that the plungers are configured to at least partially move axially independently of one another, they can self align relative to one another and provide equal hold down force on the corresponding studs.

According to another set of embodiments, provided is a mounting system for supporting a workholding device wherein the locking motion includes the first and second plungers of the dual plunger system moving along the plunger axis relative to one another when moving between the locked and unlocked conditions.

According to one set of embodiments, the locking motion of the first and second plungers of the dual plunger system are the first and second plunger moving toward another into the locked condition and moving away from one another when moving toward the unlocked conditions.

According to further embodiments, the mounting system further includes an axially floatable plunger rod that extends between a first rod end and a second rod end opposition of the first rod end and extends along the plunger axis. The plunger rod being allowed to at least partially axially float with the plunger passage along the plunger axis to allow for equalized force being applied to the hold down studs to balance hold down forced in the studs. The first plunger having a first rod opening and the second plunger having a second rod opening.

In one set of embodiments, the plunger rod has a rod head and a threaded rod portion. The system further includes at least one plunger spring. The first plunger having a head engaging surface and the first rod opening being sized to allow free relative rotation of the rod within the first passage. The second plunger having a second rod opening including a second rod opening thread and the second rod opening thread being in threaded engagement with the threaded rod portion wherein the rotation of the plunger rod relative to the second plunger causes threaded motion of the second plunger along the plunger axis within the plunger passage. With respect to the locking motion, rotation of the plunger rod in a first direction moving the second plunger inwardly toward the first plunger and the rod head engaging the head engaging surface of the first plunger to urge the first plunger toward the second plunger wherein rotation of the plunger rod in the first direction produces locking motion toward the locked condition. In that the system includes selective axial floating or motion of the plunger rod with the passage, the two plungers are automatically aligned relative to the studs once they begin to engage the studs to provide automatic axial alignment wherein generally the same hold down force on both studs can be achieved without the need for tight tolerance machining of the plungers and/or studs. This has been found to allow for a wider range of manufacturing techniques to produce the components of the invention of this application, which significantly reduces costs.

Then, rotation of the plunger rod in a second direction, that is opposite of the first direction, threadingly moves the second plunger outwardly away from the first plunger and the rod head moving away from the head engaging surface of the first plunger to allow the first and second plungers to move away from each other. The at least one plunger spring urging the first and second plungers away from one another to release the studs wherein rotation of the plunger rod in the second direction produces unlocking motion toward the unlocked condition.

According to another set of embodiments, the embodiment reference above is reversed wherein outward movement is toward the locked condition and inward movement is toward the unlocked condition (not shown).

According to yet further embodiments, the mounting system includes a dual threaded plunger rod that extends between the first rod end and the second rod end that is opposite of the first rod end and which extends along the plunger axis. The dual plunger rod being allowed to at least partially axially float with the plunger passage along the plunger axis. The dual plunger rod having a clockwise threaded rod portion at or near the first end and a counter-clockwise threaded portion at or near the second end. The first rod opening of the first plunger including a clockwise opening thread that threadingly engages the clockwise threaded rod portion and the second rod opening of the second plunger including a counterclockwise opening thread that threadingly engages the counterclockwise threaded rod portion. With respect to the locking motion, rotation of the plunger rod in the first direction threadingly moving both the first and the second plungers inwardly toward one another based on the threaded engagement between the rod and the plungers wherein rotation of the plunger rod in the first direction produces locking motion toward the locked condition. Then, rotation of the plunger rod in the second direction, that is opposite of the first direction, threadingly moving both the first and second plungers outwardly away from one another wherein rotation of the plunger rod in the second direction produces unlocking motion toward the unlocked condition with a spring.

According to even yet further embodiments, the embodiment reference above is reversed wherein outward movement is toward the locked condition and inward movement is toward the unlocked condition (not shown). Yet further, either the first or second plunger and/or rod sections can have clockwise or counterclockwise threads without detracting from the invention of this application.

According to even yet further embodiments, the system can include axially transverse alignment. More particularly, the system can include one or more plungers that include oppositely facing cams. In this respect, the plunger(s) can include a first side and a second side wherein the first side can include a first pull down cam and the second side can include a second pull down cam. Moreover, the first and second cams can be oppositely facing cams wherein the forces are balanced between the first and second cams and a first and a second stud, respectively, which are spaced from one another transverse to the plunger axis. Yet even further, the plunger(s) can be configured such that the two-sided plunger(s) is automatically axially transversely alignable relative to transversely spaced first and second pull down studs once the plunger begins to engage the first and second studs wherein to again balance forces and maximize performance without increasing manufacturing costs.

According to even other embodiments, the two sided plunger(s) can include a transverse elongation to allowed extended spacing between the first and second studs.

According to a further set of embodiments, provided is a mounting system for supporting a workholding device wherein the first and second stud passages are spaced axially from one another along the plunger axis and/or space transversely to the plunger axis.

According to further sets of embodiments, provided is a mounting system for supporting a workholding device wherein the system includes a plurality of plungers and/or a plurality of pull down studs. Further, at least one of the studs can also be a locating stud for locating the associated device with the base block.

According to a further set of embodiments, provided is a mounting system for supporting a workholding device wherein the system includes multiple plungers.

According to a further set of embodiments, provided is a mounting system for supporting a workholding device wherein the system further includes a mounting arrangement to secure the base block to another workholding element. This mounting arrangement can be any mounting arrangement known in the art including, but not limited to threaded screws and locating pins. Yet even further, the system can include other workholding element including risers, sub plates, tomb stones and base plates. Yet further, the system can be utilized with a wide range of workholding devices including, but not limited to fixturing plates, dumb bell risers and vises. In any of these embodiments, the pull down stud can be fixed relative to the devices or intricately formed in these devices.

These and other objects, features, embodiments and advantages of the invention will become apparent to those skilled in the art upon a reading of the detailed description of the invention set forth below, taken together with the drawings which will be described in the next section.

BRIEF DESCRIPTION OF THE DRAWINGS

The invention may take physical form in certain parts and arrangements of parts, and a preferred set of embodiments of which will be described in detail and illustrated in the accompanying drawings, which form a part of the specification and wherein.

DETAILED DESCRIPTION OF THE INVENTION

Figure 1:
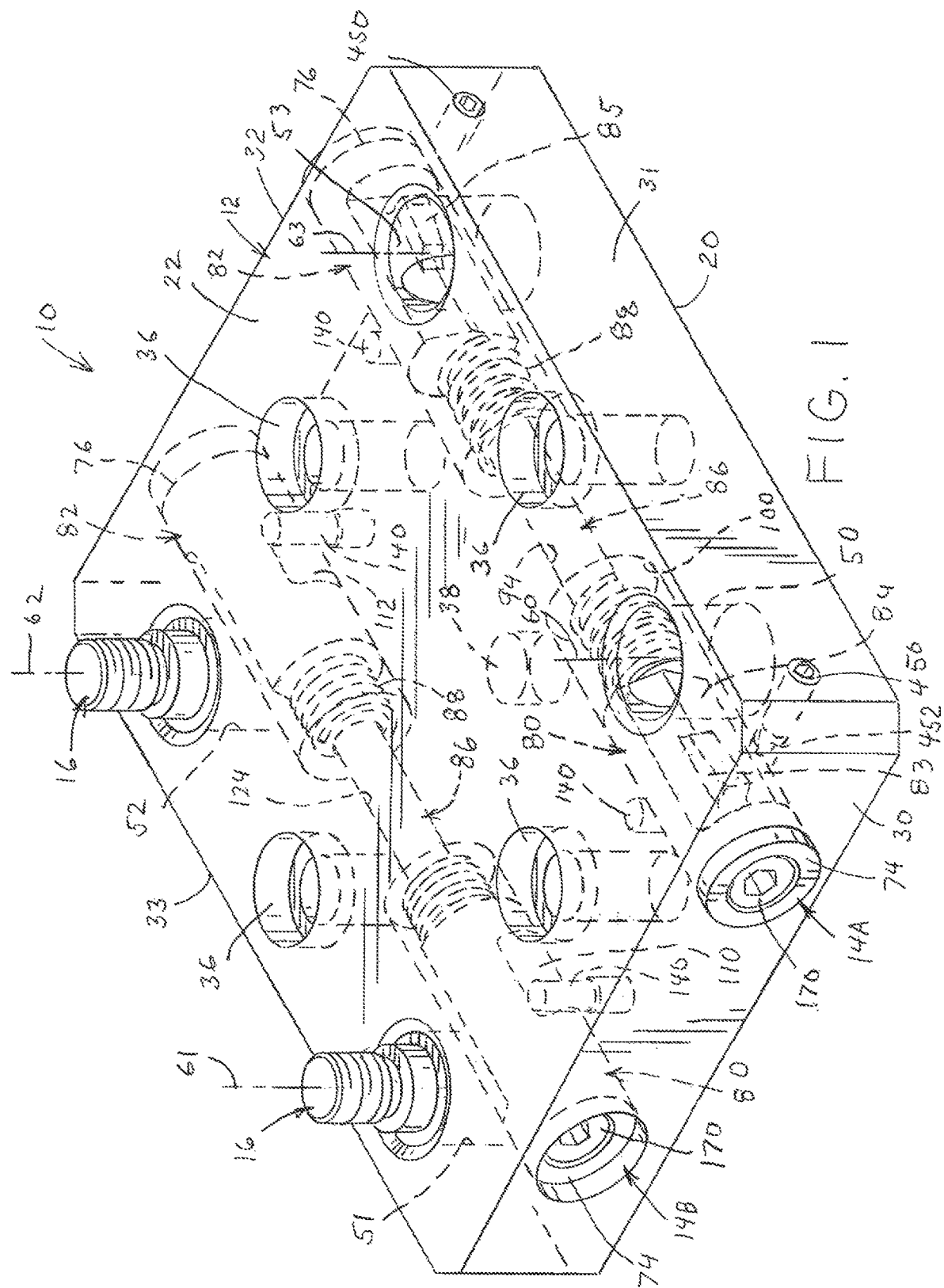
FIG. 1 is a perspective view of a mounting system according to certain aspects of the present invention which includes four plungers and four pull down studs wherein one set of plungers is shown in a locked condition and the other is shown in an unlocked condition.
Figure 2:
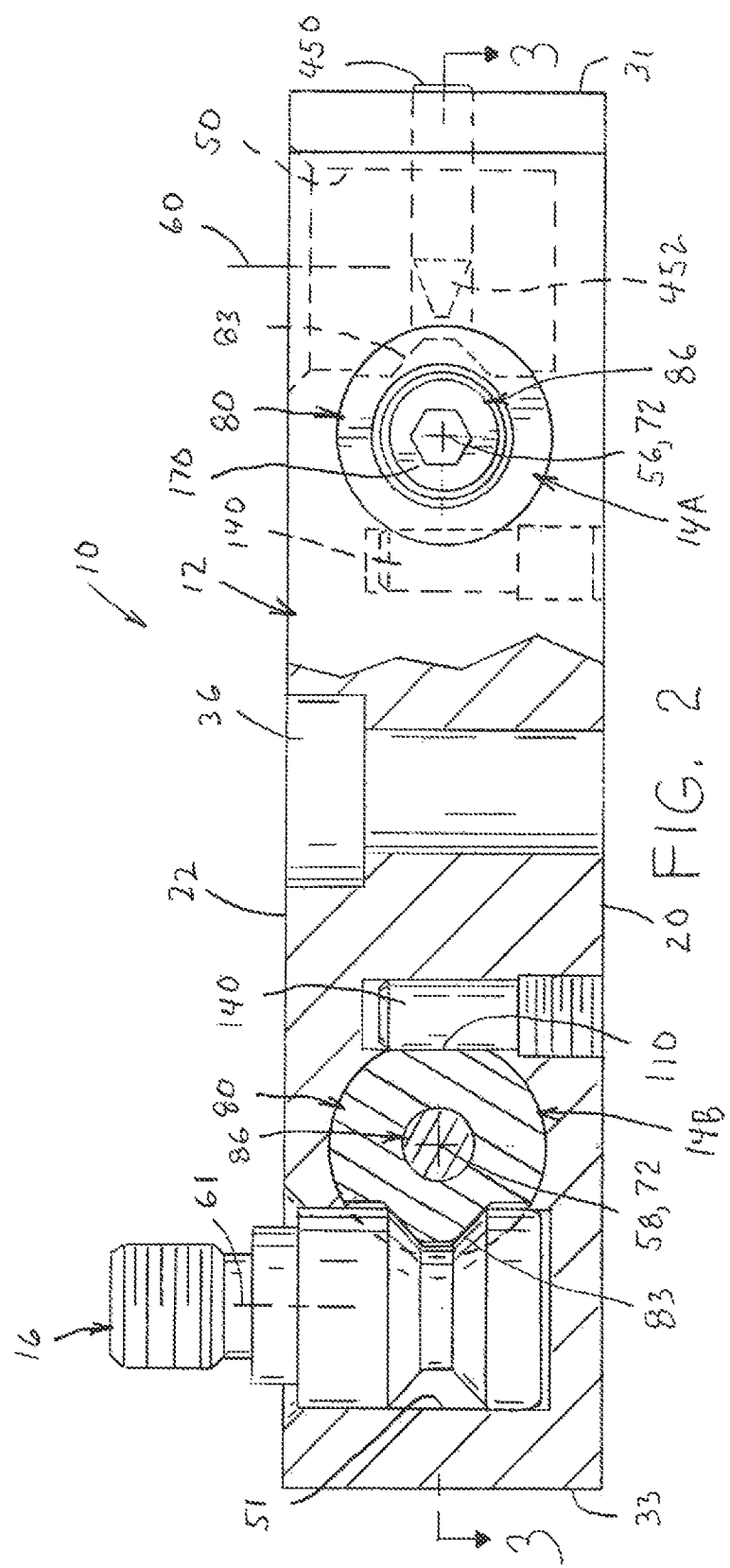
FIG. 2 is a side view, partially in section, of the mounting system shown in FIG. 1.
Figure 3:
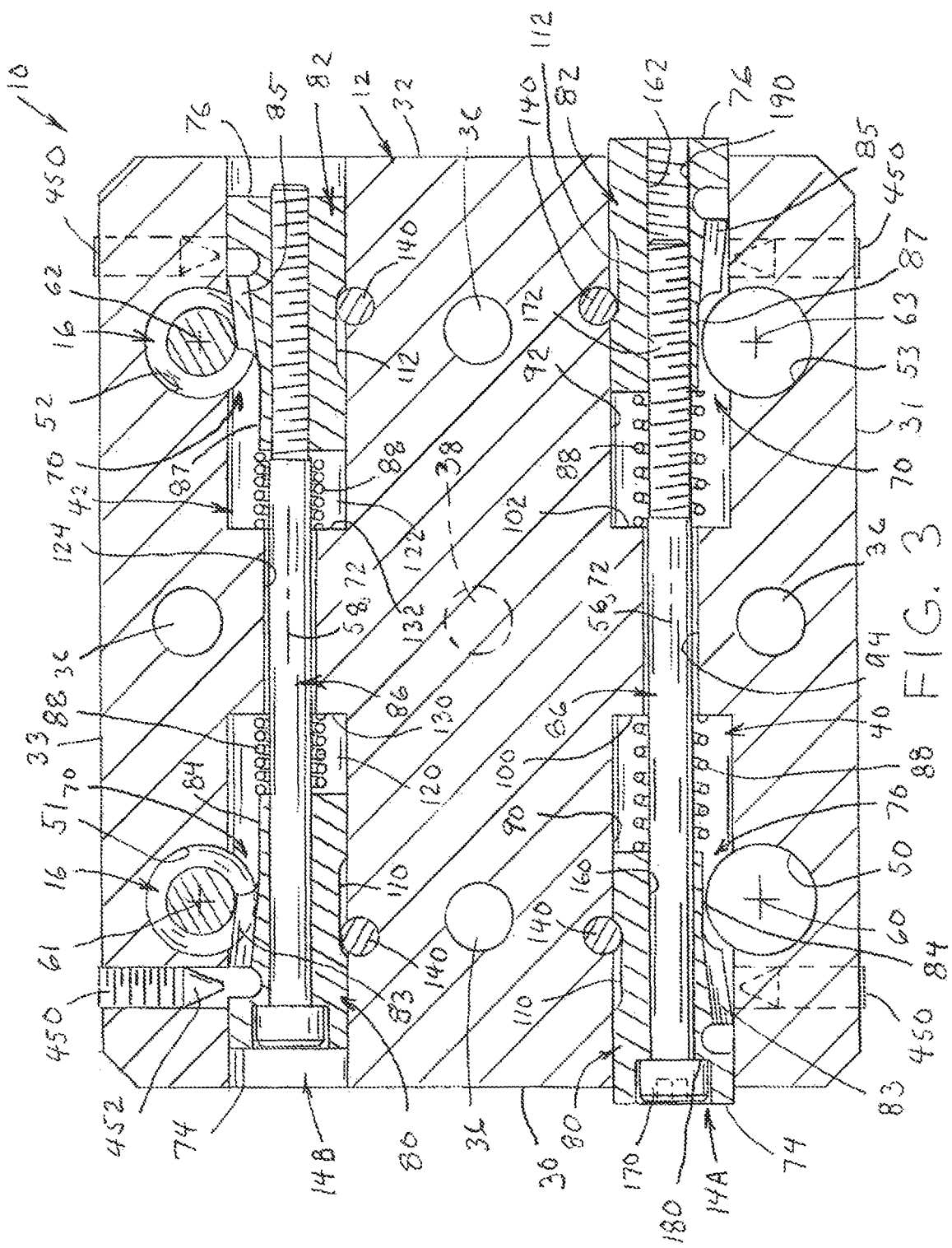
FIG. 3 is a top sectional view taken along lines 3-3 in FIG. 2.

Referring now to the drawings wherein the showings are for the purpose of illustrating preferred and alternative embodiments of the invention only and not for the purpose of limiting the same, shown in FIGS. 1-3 is a mounting system 10 that shows one of the multitude of embodiments of the invention of this application wherein the invention of this application is not to be limited to the example embodiments.

More particularly, shown is a system 10 that includes a base block 12, at least one plunger arrangement 14, and includes two or more pull down studs 16 which work together to secure an associated device (not shown) to an underlying support surface (also not shown). In this particular embodiment, two plunger arrangements are shown 14A & 14B and four pull down studs are shown 16; however, this is not required and more or less could be used. Further, these components are being commonly numbered in the interest of brevity wherein each plunger and/or each hold down stud does not need to be the identical or even substantially similar to the other ones. The associated device can include, but is not limited to one or more vises, dumb bells and/or fixture plates. Further, the underlying devices can be any support structure including, but not limited to, a tomb stone, a sub plate and a machine table.

With respect to the embodiment shown, base block 12 includes a block bottom 20 and a block top 22; however, this is not to be interpreted to indicate the orientation of this block. Block 12 further includes block sides 30-33 in that this particular embodiment is a four sided base block, but this is not required. Sides 30-33 can extend between block top 22 and block bottom 20 and can be any number of sides. Block 12 further includes one or more mounting holes 36, which can be any arrangement known in the art to secure base block 12 to the underlying support surface, not shown.

Moreover, block 12 can include one or more alignment pin openings 38, which can be any arrangement known in the art to help secure base block 12 to the underlying support surface, not shown.

Base block 12 further including plunger passages 40 and 42 and four stud passages 50-53. Stud passages 50-53 can have a wide range of configurations without detracting from the invention of this application. For example, and as is shown in certain figures, stud passages 50-53 can be blind holes in the base block. Moreover, the stud passages can be through holes extending from the block top to the block bottom. The plunger passage can extend into the base block from any surface including extending inwardly from side 30 along passage axes 56 and 58, respectively. The stud passages can extend into the base block from block top 22 along stud axes 60-63 and the stud axes are generally transverse to the corresponding plunger axes and radially spaced from the corresponding plunger axes. The stud passages intersect the plunger passages in a locking region 70.

The plunger arrangements 14A and 14B each extend along a plunger axis 72 between a first end 74 and a second end 76. Plunger arrangements 14A and 14B in this set of embodiments each include a first plunger 80, a second plunger 82 (both of which will be discussed more below) and a plunger rod 86. Plunger arrangements 14A and 14B further include one or more return springs 88, which will be discussed more below.

Plunger passages 40 and 42 can further include plunger pockets. In this respect, plunger passage 40 can include a first plunger pocket 90 shaped to receive first plunger 80 and a second plunger pocket 92 shaped to receive second plunger 82 wherein passage 40 can include a central rod opening portion 94 shaped to allow passage of only plunger rod 86 wherein first plunger pocket 90 includes a spring wall or surface 100 and second plunger pocket 92 includes a second spring wall or surface 102. Further, first plunger pocket 90 can be configured to prevent relative rotation of first plunger 80 within pocket 90 and second plunger pocket 92 can be configured to prevent relative rotation of second plunger 82 within pocket 92. As is shown, but is not required, system 10 includes an anti-rotation pin 140 and first plunger 80 includes a flat section 110 and second plunger 82 includes a flat section 112. These anti-rotation features can be any features that allow relative axial movement of plungers 80 and 82 along plunger passage axis 56 without relative rotation about axis 56; one of which will be discussed more below. Yet even further, pin 140 can be an actuation stop pin that limits the travel of the plunger within the plunger passage, which can have multiple function in relation to the systems of this application. In this respect, pins 140 can be utilized to ensure that the plungers remain within the plunger passages. Moreover, the stops can help to control the outward movement of the plungers when the plungers are being loosened. In that the plunger are capable of floating within the plunger passage, so that they can self center relative to the pull down studs, one plunger could release from the pull down stud before the other plunger releases from the pull down stud. If this occurs, the stops could be utilized to stop the travel of the one plunger to direct the loosening force to the other plunger to release the other plunger from the pull down stud. Thus, the stops can ensure that both plungers release from both pull down studs.

Similarly, plunger passage 42 can include a first plunger pocket 120 shaped to receive first plunger 80 and a second plunger pocket 122 shaped to receive second plunger 82 wherein passage 42 can include a central rod opening portion 124 shaped to allow passage of only plunger rod 86 wherein first plunger pocket 120 includes a spring wall or surface 130 and second plunger pocket 122 includes a second spring wall or surface 132. Further, first plunger pocket 120 can be configured to prevent relative rotation of first plunger 80 within pocket 120 and second plunger pocket 122 can be configured to prevent relative rotation of second plunger 82 within pocket 122. As is shown, but is not required, first plunger 80 can include flat section 110 and second plunger can include flat section 112 that work in connection with pins 140 to prevent unwanted rotation. Again, these features can be any features that allow relative axial movement of plungers 80 and 82 along plunger passage axis 58 without relative rotation about axis 58. Moreover, and as will be discussed more below, the shape of the plunger pocket/passage and the plunger also can be utilized and/or configured to allow for other features for the system.

In this set of embodiments, plunger rod 86 is allowed to at least partially selectively float within the plunger passage along the plunger axis. In this respect, first plunger 80 has a first rod opening 160 and second plunger has a second rod opening 162. In one set of embodiments, plunger rod 86 has a rod head 170 and a threaded rod portion 172. The first plunger further includes a head engaging surface 180 and first rod opening 160 that can be sized to allow free relative rotation of rod 86 within first opening 160. Second rod opening 162 can include a second rod opening threaded portion 190 and the second rod opening threaded portion being in threaded engagement with threaded rod portion 172 wherein the rotation of plunger rod 86 relative to the second plunger causes threaded motion of the second plunger along the plunger axis within the plunger passage. As with any embodiments in this application, the threaded portion(s), which are relative to the plunger(s), can be a part of the plunger itself and/or a separate component that is fixed relative to and/or engages the plunger to produce the noted movement. Thus, the plunger(s) can be a unitary component and/or an assembly without detracting from the invention of this application. With respect to the locking motion, rotation of the plunger rod in a first direction threadingly moves second plunger 82 inwardly toward first plunger 80 and rod head 170 engaging head engaging surface 180 of first plunger 80 to urge the first plunger toward the second plunger at least when contact is made with the hold down studs. Continued rotation of the plunger rod in the first direction produces locking motion toward the locked condition, which is shown in second plunger arrangement 14B. In that system 10 includes selective axial floating and/or automatic axial adjustment or motion of rod 86, plungers 80 and 82 are automatically axially aligned relative to studs 16 during engagement therewith and will provide generally the same hold down force on both without the need for tight tolerance machining of the plungers and/or studs. In greater detail, first plunger 80 includes a first axially extending cams 83 that generally extends parallel to the plunger axis and can include any type of cam surfaces to facilitate the locking action between the axial cam and the stud. First plunger 80 further includes a clearance path 84 that can be directly adjacent to cam 83, but this is not required. As will be discussed more below, the clearance path can be any configuration to allow entry of the stud into the stud passage including, but not limited to, a pocket, a plunger edge and/or an extent of the plunger. Similarly, second plunger 82 includes a first axially extending cams 85 that generally extends parallel to the plunger axis and can include any type of cam surfaces to facilitate the locking action between the axial cam and the stud. Second plunger 82 further includes a clearance path 87, which can be directly adjacent to cam 85, but this is not required. Again, the clearance path can be any configuration to allow entry of the stud into the stud passage including, but not limited to, a pocket, a plunger edge and/or an extent of the plunger. As is referenced above, U.S. Pat. No. 8,708,323 to Hoyt is incorporated by reference into this application wherein the '323 Patent details axial cams that can be utilized, stud cams that can be utilized, the engagement between the stud and the plunger wherein, in the interest of brevity, this is not again described in detail in this application.

To loosen the system, plunger rod is rotated in a second direction, that is opposite of the first direction, which threadingly moves second plunger 82 outwardly away from first plunger 80. Continued rotation will move rod head 170 away from head engaging surface 180 of first plunger 80 to allow the first and second plungers to move away from each other. At least one plunger return spring 88 can be used to urge the first and second plungers away from one another without threaded engagement between the first plunger and the rod wherein rotation of the plunger rod in the second direction produces unlocking motion toward the unlocked condition shown in first plunger arrangement 14A.

Figure 4:
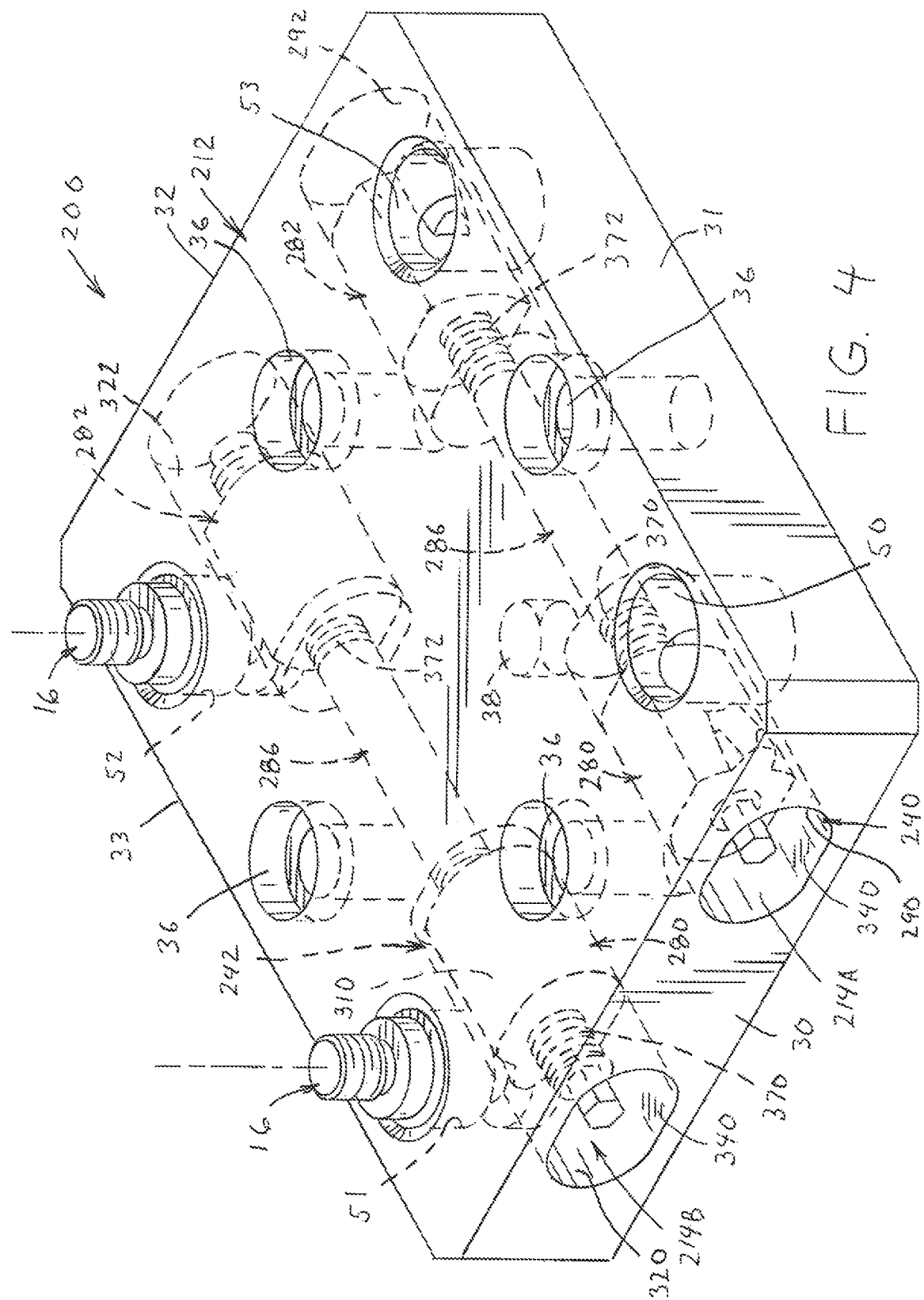
FIG. 4 is a perspective view of a mounting system according to certain other aspects of the present invention which also includes four plungers and four pull down studs wherein one set of plungers is shown in a locked condition and the other is shown in an unlocked condition; and, FIG. 5 is a top sectional view of the mounting system shown in FIG. 4.
Figure 5:
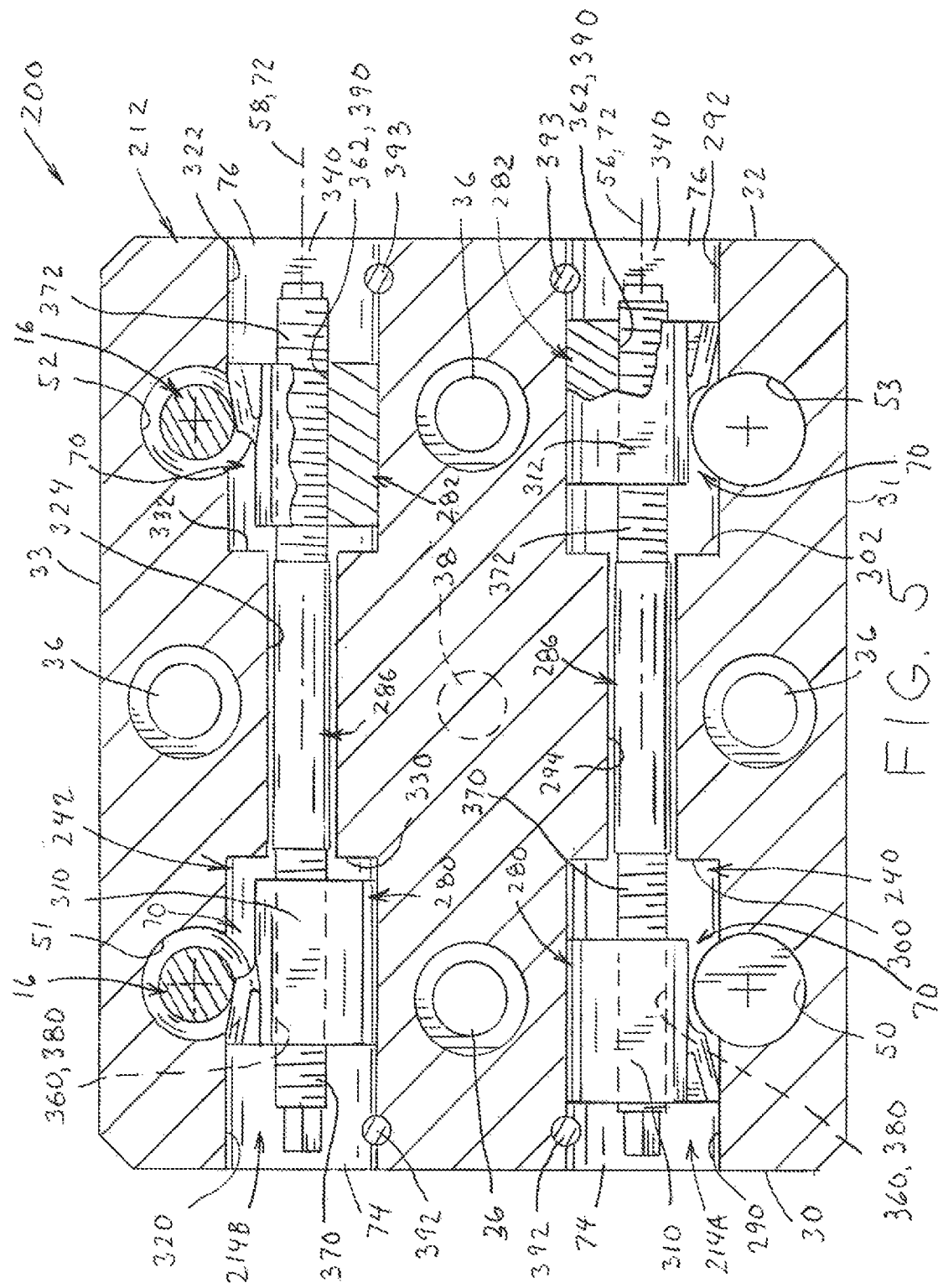

With reference to FIGS. 4 & 5, shown is a system 200 that includes a different set of plunger arrangements. However, in the interest of brevity, the discussion of system 200 will be limited to these distinctions. In addition, like reference number will be used to simplify the disclosure. However, this is not to be interpreted to limit the invention or to assert substantial identity therebetween.

In greater detail, system 200 includes a base block 212 that can have the same features described above with respect to block 12. Base block 12 includes plunger passages 240 and 242 and four stud passages 50-53 that can be the same as above. The plunger passage can extend into the base block from any surface including extending inwardly from side 30 along passage axes 56 and 58, respectively. System 200 includes plunger arrangements 214A and 214B that each extend along plunger axis 72 between first end 74 and second end 76. The plunger arrangements in this set of embodiments includes a first plunger 280, a second plunger 282 and a plunger rod 286.

As with the embodiments discussed above, plunger passages 240 and 242 can extend through the base block or be formed by plunger pockets. In this respect, plunger passage 240 can include a first plunger pocket 290 shaped to receive first plunger 280 and a second plunger pocket 292 shaped to receive second plunger 282 wherein passage 240 can include a central rod opening portion 294 shaped to allow passage of only plunger rod 286. As with the embodiment above, pins 140, opening 294 and/or other features can be used alone or in combination to limit the axial float of plunger rod 286. In addition, first plunger pocket 290 includes an inner wall or surface 300 and second plunger pocket 292 includes a second inner wall or surface 302. While springs are not shown in this embodiment, they could be used. Further, first plunger pocket 290 also can be configured to prevent relative rotation of first plunger 280 within pocket 290 and second plunger pocket 292 can be configured to prevent relative rotation of second plunger 282 within pocket 292. As is shown, but is not required, system 200 can include an anti-rotation passage flats 340 in the passages and first plunger 280 can includes a flat section 310 and second plunger 282 includes a flat section 312. These anti-rotation features can be any features that allow relative axial movement of plungers 280 and 282 along plunger passage axis 56 without relative rotation about axis 56.

Similarly, plunger passage 242 can include a first plunger pocket 320 shaped to receive first plunger 280 and a second plunger pocket 322 shaped to receive second plunger 282 wherein passage 242 can include a central rod opening portion 324 shaped to allow passage of only plunger rod 286 wherein first plunger pocket 320 includes an inner wall or surface 330 and second plunger pocket 322 includes a second inner wall or surface 332. Further, first plunger pocket 320 can be configured to prevent relative rotation of first plunger 280 within pocket 320 and second plunger pocket 322 can be configured to prevent relative rotation of second plunger 282 within pocket 322. As is shown, but is not required, first plunger 280 can include flat section 310 and second plunger 282 can include flat section 312 that work in connection with passage flats 340 to prevent rotation. Again, these features can be any features that allow relative axial movement of plungers 280 and 282 along plunger passage axis 58 without relative rotation about axis 58.

In this set of embodiments, plunger rod 286 is also allowed to at least partially selectively float within the plunger passage along the plunger axis as discussed above. However, in this embodiment, first plunger 280 has a first rod opening 360 and second plunger has a second rod opening 362 that are both threaded. In this respect, plunger rod 286 includes a first threaded rod portion 370 having a clockwise thread and a second threaded rod portion 372 having a counterclockwise thread (or vice versa). First plunger 280 further includes a clockwise threaded portion 380 included in first rod opening 362 configured to threadingly engage first threaded rod portion 370 within first opening 360. Second rod opening 362 includes a second rod opening threaded portion 390 that is a counterclockwise thread for threaded engagement with second threaded portion 372 wherein the rotation of plunger rod 286 relative to the plungers cause opposite threaded motion of both plungers. Again, the clockwise and counterclockwise threads could be reversed without detracting from the invention of this application. With respect to the locking motion, rotation of the plunger rod in a first direction threadingly moves both the first and second plungers inwardly toward one another based on the threaded engagement between the rod and the plungers wherein rotation of the plunger rod in the first direction produces locking motion toward the locked condition shown with respect to plunger arrangement 214B. In that rod 286 is allowed to selectively float within the passage, the plungers automatically center relative to studs 16 during engagement therewith to provide substantially equal hold down force. Then, rotation of the plunger rod in the second direction, that is opposite of the first direction, threadingly moves both the first and second plungers outwardly away from one another wherein rotation of the plunger rod in the second direction produces unlocking motion toward the unlocked condition as is shown in plunger arrangement 214A. System 200, and the other systems of this application, can further include a pair of stops 392 and 393 which can have multiple function in relation to the systems of this application. In this respect, stops 392 and 393 can be utilized to maintain a proper rotational orientation of the plunger within the passage and/or can ensure that the plungers remain within the plunger passages. Moreover, the stops can help to control the outward movement of the plungers when the plungers are being loosened. In that the plunger are capable of floating within the plunger passage, so that they can self center relative to the pull down studs, one plunger could release from the pull down stud before the other plunger releases from the pull down stud. If this occurs, the stops could be utilized to stop the travel of the one plunger to direct the loosening force to the other plunger to release the other plunger from the pull down stud. Thus, the stops can ensure that both plungers release from both pull down studs.

The plungers can include a wide range of radially outwardly facing outer plunger surfaces to allow the plungers to be controllably received in the corresponding plunger pockets without detracting from the invention of this application. A couple of which are shown in this application, but this application is not to be limited to the example embodiments shown.

The pull down studs 16 are shaped to be received in one of stud passages 50-53 and are connectable with one or more associated devices (not shown) to secure and position the device relative to the block. Studs 16 extend between a stud inner end and a stud outer end and include a locking groove between the stud ends. When in the unlocked condition, clearance slot of the respective plunger is aligned with the stud passage allowing the stud groove to enter the locking region. As will be discussed more below, the clearance slot can have a wide range of configurations without detracting from the invention of this application. In this respect, the clearance slot can include a recess or pocket in the plunger itself to allow the passage of the stud into locking region 70. However, it can also include a shortened plunger wherein an inner edge of the plunger forms the clearance. In this respect, the stud can pass into the locking region when the plunger is spaced from the locking region and wherein the plunger is thereafter moved into the locking region to engage the stud. Once the stud is in the locking region, axial movement of the plunger along the plunger axis directs the respective pull down cam into the stud groove thereby engage the pull down cam against the stud groove and urging the stud into the stud passage thereby providing a hold-down force between the base block and the associated device for securing the associated workholding device relative to the base block.

As for the rotation of plunger rod 86, 286, any head design can be utilized without detracting from the invention of this application. This includes external head designs as is shown in FIGS. 4 & 5 and internal head designs as is shown in FIGS. 1-3.

According to yet other embodiments, the plungers can be an assembly have a core portion and an external portion. And, the core portion can be allowed to rotate while the external portion is fixed relative to the passage.

In yet other embodiments, the plungers can be actuated by any means known in the art including, but not limited to, pressurized air, hydraulics, toggle mechanisms and knobs.

As is referenced above, the mounting system can include a wide range of pull down studs and/or plungers without detracting from the invention of this application. Further, the base block can be configured such that the block top can extend in any direction including, but not limited to extending horizontally.

According to other embodiments of the invention of this application, the stud groove of stud 16 can be a V-shaped groove that extends circumferentially about the corresponding stud axes. Further, stud 16 can be a cylindrical shaped stud wherein the orientation (rotational) of stud 16 relative to stud passages 50-53 is not important wherein stud groove will align with locking region 70 regardless of the stud rotational orientation in the stud passage. In other embodiments, pull down stud 16 can have other configurations and/or stud groove can be configured to prevent rotation of the stud relative to the block when in the locked condition. While this can be handled by the clamping forces between the stud and the block, it can also be handled by mating configuration designed to prevent rotation. Yet even further, at least one stud can be a locating stud wherein at least a portion of the stud has a tight tolerance fit with the stud passage to locate the this locating stud relative to the base block. As a result, the system of this application can both hold the associated device relative to the base block and position the associated device relative to the base block in a predetermined location. As can be appreciated, this can be used to quickly mount the associated device in a desired position and/or repeatedly mount multiple associated devices in a (for example) machining operation to run production. Studs 16 can include a interengagement configuration to help secure the stud to an associated device. This can include, but is not limited to, a threaded opening and/or a pilot head. As can be appreciated, the threaded opening can be any threaded opening and pilot head can be any shape including any mating shape.

Figure 6:
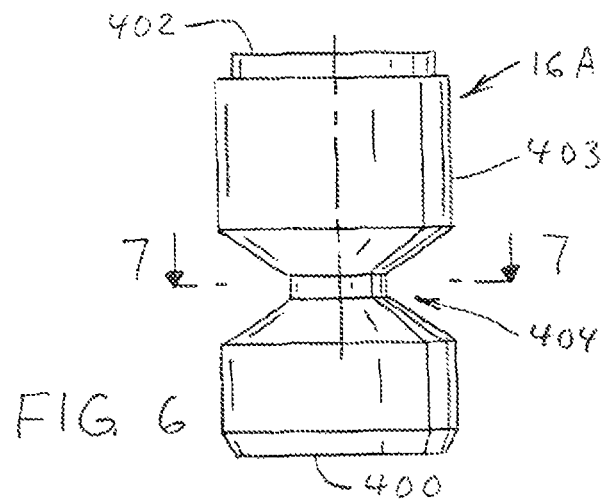
FIG. 6 is an elevational view of a stud according to certain aspects of the present invention.
Figure 7:
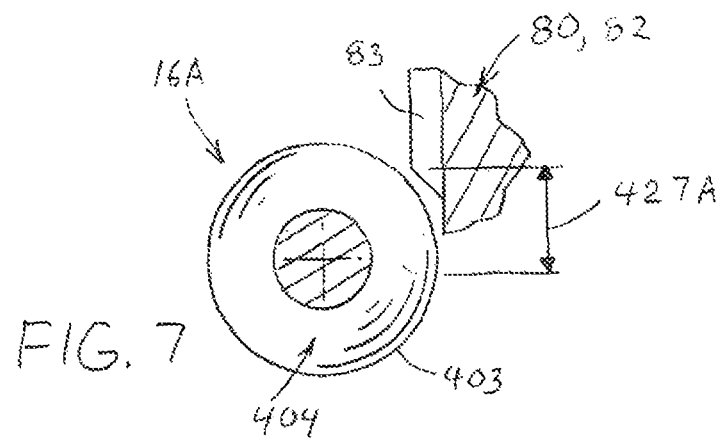
FIG. 7 is a sectional view taken along line 7-7 in FIG. 6.
Figure 8:
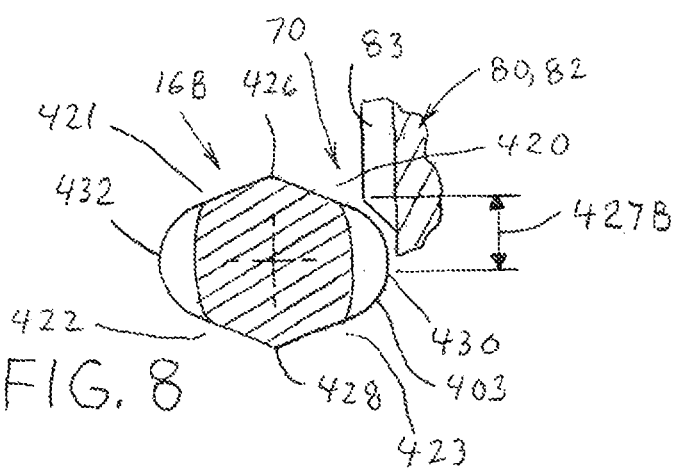
FIG. 8 is a sectional view similar to FIG. 7.

With reference to FIGS. 6-8, stud 16 can be a wide range of configuration without detracting from the invention of this application. As noted above, studs 16 are shaped to be received in one of stud passages 50-53 and are connectable with one or more of the top tooling (again, not shown) to secure and position the tooling relative to block 12. Studs 16 extend between a stud inner end 400 and a stud outer end 402 and include an outer surface 403. Studs 16 further include a stud cam or locking groove 404 between the stud ends. When the system is in the unlocked condition, there is a clearance path associated with the respective plunger that is aligned with the stud passage. As is noted above, this can include a wide range of configurations without detracting from the invention. This alignment allows the stud to enter the stud passage and allows for the alignment of the stud cam in the locking region. Once the stud cam is in the locking region, axial movement of the plunger along the plunger axis directs the respective plunger or pull down cam into stud cam 404 thereby engaging the plunger cam against the stud cam and urging the stud into the stud passage and/or into a desired locking position thereby providing a holding force between the base block and the associated device for securing the associated top tooling relative to the base block. FIG. 6 shows a side view of stud 16A in accordance to certain aspects of the invention of this application. FIGS. 7 and 8 show examples of different cross-sectional configurations that could be used for stud 16. FIG. 7 shows stud 16A that is a prior art stud configuration that has a round configuration. FIG. 8 shows stud 16B in accordance with certain aspects of the invention that includes a diamond-shaped stud configuration. Stud 16B can include a similar stud cam or locking groove 404 as any prior stud without detracting from the invention of this application. In greater detail, stud 16B includes leading edge 426 and a trailing edge 428. Stud 16B further includes a first side or edge 430 and a second side or edge 432. As is shown, leading edge 426 face the direction in which the plunger moves toward and away from the pull down stud. In this orientation, first side or edge 430 faces locking region 70 wherein the locking action between the plungers and the pull down studs take place. Stud 16B further includes at least one clearance region 420 within the locking region wherein stud 16B is non-circular. Stud 16B can include multiple clearance regions 420 wherein the stud shown includes four clearance regions 420-423, which produces a diamond shaped configuration. This allows cam engagement to take place in four different alignments between the stud and the plunger cam. The use of the at least one clearance region 420 reduces the amount of axial travel 427 that is needed for the plunger to clear the stud passage and allow the stud to enter the passage. Thus, the resulting axial travel 427 needed to actuate the plunger between the unlocked condition and the locked condition (and vice versa) is significantly reduced. However, the clearance path does not have to extend the entire length of the stud wherein an operation portion of the stud can include the clearance path. As is shown, axial travel 427B of stud 16B with relief 420 is less than axial travel 427A of a traditional round stud. Moreover, this stud configuration can be utilized with respect to any embodiments of this application.

While a two locking region plunger is shown in the figures of this application, the number of locking regions per plunger is unlimited. For example, a single locking region could be utilized which could be used to secure a single dumb bell riser. Or, three or more regions could be used for larger and/or more precise mounting configurations.

In yet other embodiments, the plunger can be configured to be inset within the plunger passage when in the locked condition. This can be utilized to prevent the plunger from interfering with an associated operation such as a machining operation. For example only, the mounting system of this application can be utilized on a 5 axis machine wherein the machining head can move about and below the part being machined. As can be appreciated, a plunger extending outwardly of the base could become an obstacle for this machining head. Further, the invention of this application can be used in combination with any tooling known in the art or which will be known in the art in the future. Again, this can include a wide range of sub plates, riser both above and below the base block and vises. It has been found to work particularly well with dovetail vises.

Yet even further, the system can further include a mounting arrangement to secure the base block to these other workholding elements. This can include, but is not limited to, threaded screws and locating pins, and assignee's BALL LOCK system or other systems such as the ones disclosed in U.S. patent application Ser. No. 12/754,026 to Schron which is incorporated by reference into the specification of this application.

Other embodiments include one or more hold down studs 16 being joinable to the (for example only) fixturing plate, a dumb bell riser and a vise. In other embodiments, the stud can be a part of these devices wherein the associated device is manufacture with one or more hold down studs.

In yet other embodiments, the system can include a plunger retainer which can be a threaded plug to engage a pocket in one or more of the plungers. This arrangement can be used to prevent the plunger from falling from the plunger passage and/or control movement of the plungers.

Yet even further, the system can further include one or more disengagement arrangements 450 as is shown in FIGS. 1-3. The disengagement arrangements can help release plungers 80 and/or 82 if the plungers become locked in the locked condition against the stud within the plunger pocket. This can occur due to wear or overtightening of the plunger against the stud. However, when this happens, the system can be difficult to disassemble without damaging the system and/or destroying the base block. Arrangement 450 can include a set screw, wedge pin, or other mechanical device that is in alignment with the plunger within the plunger pocket when in the locked condition. The arrangement includes a shaped end 452 to engage a designated disengagement surface of the plungers to urge or move the plunger slightly in the unlocking direction to break it loose from the locked condition. Surface 452 can be angled such that tightening of arrangement 450 urges the plunger axially toward the unlocked condition. Disengagement arrangement can enter the pocket from any side of the base block, but it is preferred that it enter by way of one of the sides of the base block to allow the end user to manually disengage the plunger from the stud pocket when the system is in a mounted condition to allow selective release of the plunger during use.

Figure 9:
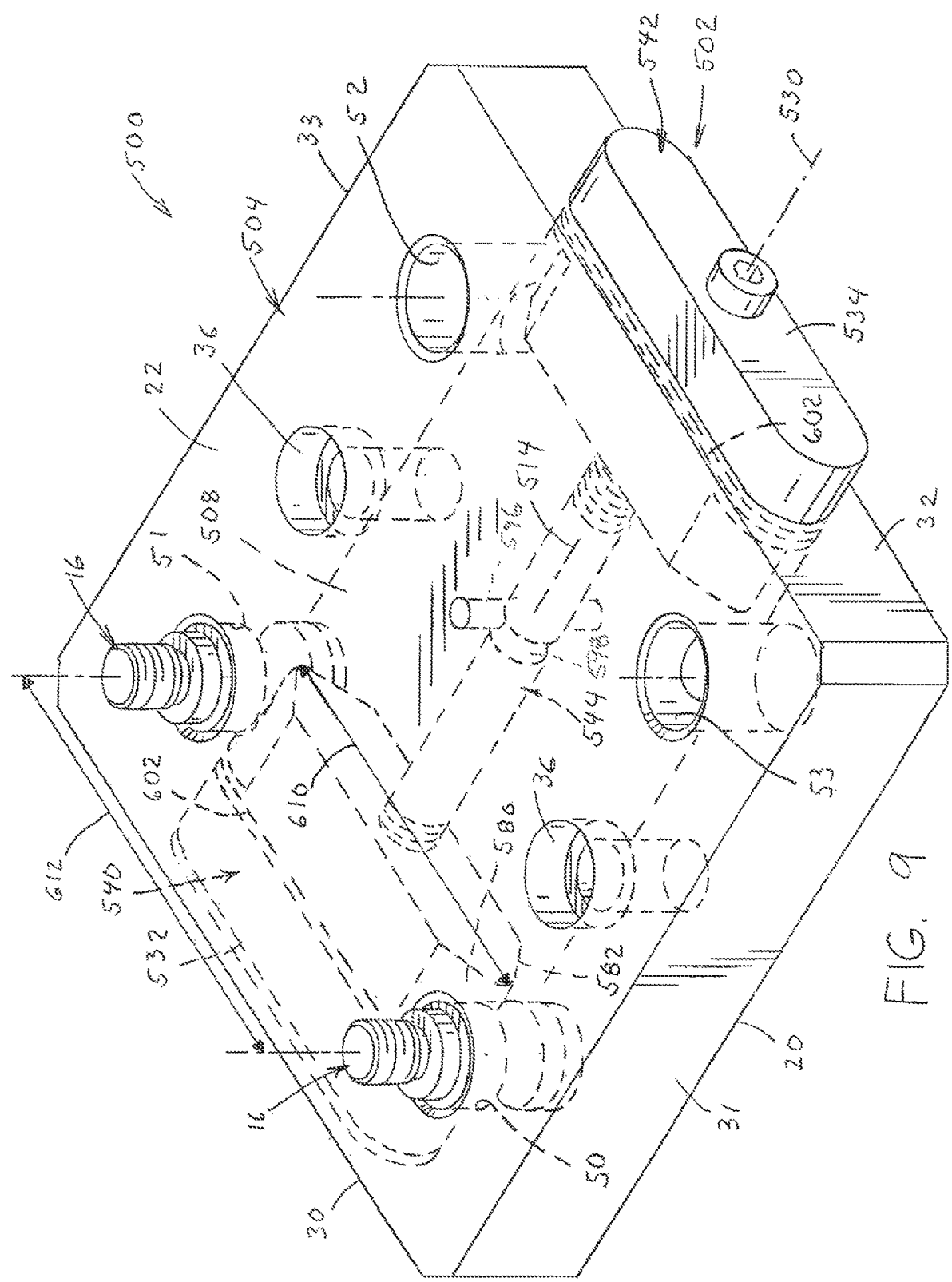
FIG. 9 is a perspective view of yet another mounting system according to other aspects of the present invention.
Figure 10:
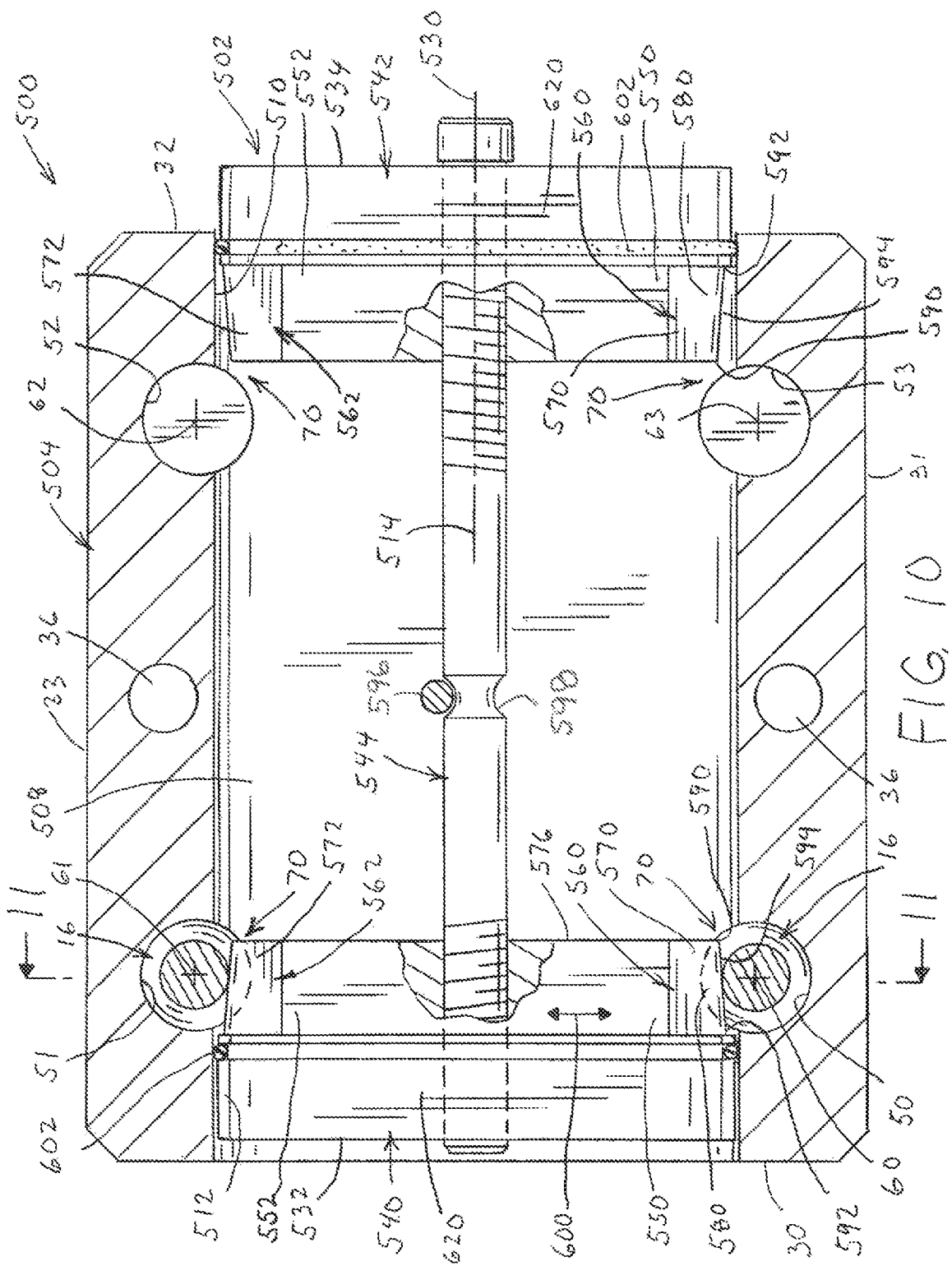
FIG. 10 is a top sectional view of the embodiment shown in FIG. 9.
Figure 11:
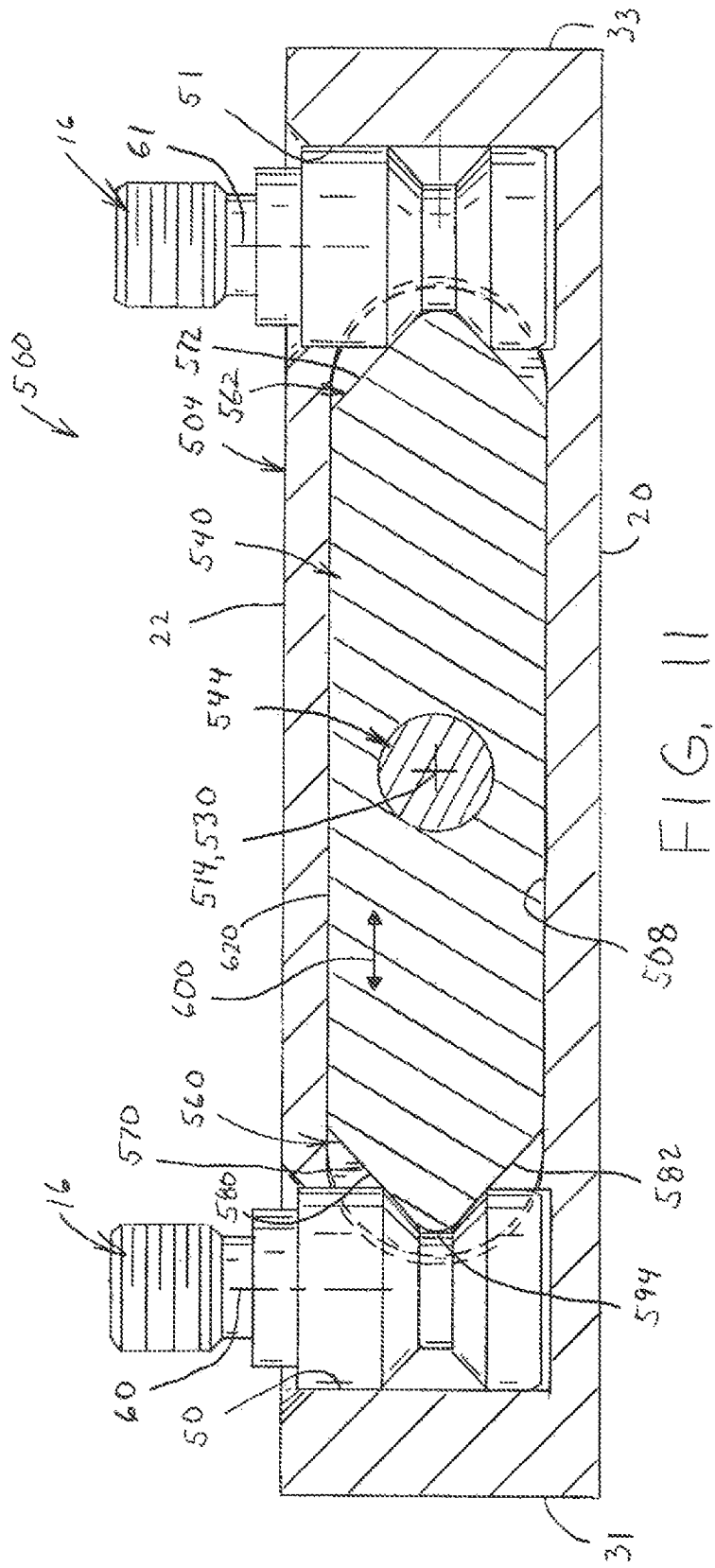
FIG. 11 is a sectional view taken along line 11-11 in FIG. 10.

With reference to FIGS. 9-11, shown is yet another set of embodiments that show axially transverse automatic alignment for the plunger cams. In this respect, and as is discussed more above, the system of this application can include axially spaced cams that can move relative to one another to allow axial alignment between the cams to help the cams self align to thereby both balance forces and reduce manufacturing tolerances thereby both increasing performance and reducing costs. The embodiments of FIGS. 9-11 can include any of the structure described in greater detail above. Accordingly, in the interest of brevity, these structures will not be repeated in reference to these embodiments. In greater detail, the embodiments and/or invention of this application can further include automatic alignment with respect to plunger cams that is transverse to one another with respect to the plunger axis in addition to the axial alignment. Moreover, the balancing of forces can also be transverse to the plunger axis.

In greater detail, shown is a system 500 that includes a plunger arrangement 502. Again, in the interest of brevity, the discussion of system 500 will be limited to these distinctions. In addition, like reference number again will be used to simplify the disclosure. However, this is not to be interpreted to limit the invention or to assert substantial identity therebetween.

As with the embodiments shown above, system 500 includes a base block 504, which can have the same features as the based blocks described above. Again, since aspects of the base block shown in these embodiments can be the same, common reference numbers are being used in the interest of brevity and clarity. However, this should not be interpreted to narrow the disclosure and the invention of this application. Again, there are also distinction in the base block of this set of embodiments, which allow for the function of the plungers of these embodiments. Moreover, other changes could be made to the base block and/or the plungers without detracting from the invention of this application. Base block 504 includes a block bottom 20 and a block top 22; however, this is not to be interpreted to indicate the orientation of this block. Base block 504 further includes block sides 30-33 in that this particular embodiment is a four sided base block, but this is not required. Sides 30-33 can extend between block top 22 and block bottom 20 and can be any number of sides. Base block 504 further includes one or more mounting holes 36, which can be any arrangement known in the art to secure base block 12 to the underlying support surface, not shown. In the embodiment shown, there are only two mounting holes.

In the interest of brevity, system 500 is shown such that one plunger is shown in FIG. 10. in the unlocked condition and the other is shown in the locked condition, which will be discussed more below. Base block 504 including a single plunger passage 508, but this is not required. Moreover, the embodiment shown includes a plunger passage that extends through the entire block wherein it does not include plunger pockets, but this is not required either wherein this set of embodiments can include separate plunger pockets and/or other features described in greater detail above in relation to other embodiments of this application. Plunger passage include passage portions 510 and 512. As is shown, passage portion 510 is shown in an unlocked condition and passage portion 512 is shown in a locked condition. However, in operation, both portions would be in either the locked or the unlocked condition under normal circumstances. Base block 504 includes four stud passages 50-53 that are configured to receive four studs 16, but more or less than four could be utilized. Again, in the interest of brevity, the studs and the locking of the studs will not be discussed in detail with respect to this set of embodiments. The plunger passage can extend into the base block from any surface including extending inwardly from sides 30 and 32 along a passage axis 514. The stud passages can extend into the base block from block top 22 along stud axes 60-63 and the stud axes are generally transverse to the corresponding plunger axes and radially spaced from the corresponding plunger axes as is discussed in greater detail above. The stud passages intersect the plunger passages in a locking region 70.

The plunger arrangement 502 extends along a plunger axis 530 between a first end 532 and a second end 534 wherein end 532 is shown in the locked condition and end 534 is shown in the unlocked condition in FIG. 10. Plunger arrangement 502 in this set of embodiments includes a first plunger 540 and a second plunger 542 and a plunger rod 544. Plunger arrangement 502 can further includes one or more return springs (not shown), which can function as described above wherein the embodiments of this application can be modified to include any aspects described above with respect to the other embodiments of this application. Moreover, the embodiments described in this application are examples of the invention of this application wherein these examples are not intended to limit the invention of this application and wherein other embodiments, and equivalences thereto, are part of this application.

The main distinction in this embodiment is that plunger arrangement 502 includes plunger configuration having a first side 550 and a second side 552 wherein first side 550 includes a first cam region 560 and second side includes a second cam region 562, which opposes the first cam region. In that the first and second cam regions oppose one another, the forces on the plunger are balanced; or at least more balanced. Moreover, and as will be discussed more below, the plunger(s) can be automatically transversely alignable to improve performance, balance locking forces, reduce jamming and reduce costs.

First cam region 560 includes a first pull down or locking plunger cam 570 and second cam region 562 includes a second pull down or locking plunger cam 572. Either cam region can include an axially spaced clearance slot or path or, as is shown, the plunger can include a shortened design wherein an inner edge extent 576 of the plunger can form the slot or path. The slot or path is configured to allow passage of the pull down stud into the locking region. The cams are axially extending cams that generally extend parallel to plunger axis 530 but include cam surfaces 580 and 582 that begin at or near the clearance path or inner edge 576. The cam surfaces start at a first end 590 and extend toward a second end 592. Moreover, cam surfaces 580 and 582 can diverge from one another and diverge from axis 530 thereby forming a cam having a generally V-shaped cross-sectional configuration having a base edge 594, but which diverges radially from axis 530 from end 590 to end 592. Base edge 594 can directly connect cam surfaces 580 and 582, and can include a radiused portion separating these surfaces. Further, edge 594, cam surfaces 580 and/or 582 can further include one or more relief cuts between the cam surfaces and can form the beginning of the slot or path. In addition, the cams can have one or more lead in cuts or chamfers at or near end 590 to help facilitate and guide the cam into the stud cams of studs 16. However, while V-shape cams are shown and described with two cam surfaces, the cams could include a single cam surface that is generally aligned axially with the plunger axis and which diverges from the axis to lockingly engage with studs 16. However, while like numbers are being used for both plungers, that does not mean that the plunger must be the same. Different stud spacing could be included for each of the plungers in the system without detracting from the invention of this application.

In addition, the plungers can be configured to include lateral clearance between the plunger and the passage or passage portion(s) to allow transverse movement in direction 600. This can be utilized to produce the automatically transversely alignability for the improved performance, balanced locking forces, reduced jamming and reduced costs. As with all of these embodiments that include axial and/or transverse axial alignability, adjacent plungers, either axial adjacent and/or transversely adjacent, can move relative to one another and/or relative to the stud passages to automatically adjust and balance forces during the movement of the plungers toward the locked position. For the axial adjustability, the adjacent plunger can move axially relative to one another and the plunger rod can include a desired level of axial float or movement. This can be produced by any mechanical structure without detracting from the invention of this application. This can include, but is not limited to a central wall portion (as described above), one or more pins engaging one or more recesses in plunger rod and the like. As is shown, system 500 can include a travel restriction pin 596 that can limit travel and allow for automatic centering of the plungers as is described above in greater detail. Pin 596 can interengage with a rod pocket 598 that can have a pocket width that is greater than the pin size to allow axial movement of the rod to allow the self centering axial movement of the rod and plungers. Again, pin 596 can have multiple function in relation to the systems of this application wherein it also can be utilized to ensure that the plungers remain within the plunger passages. Moreover, the pin 596 can help to control the outward movement of the plungers when the plungers are being loosened. In that the plunger are capable of floating within the plunger passage, so that they can self center relative to the pull down studs, one plunger could release from the pull down stud before the other plunger releases from the pull down stud. If this occurs, pin 596 can be utilized to stop the travel of the one plunger to direct the loosening force to the other plunger to release the other plunger from the pull down stud. Thus, the pin can ensure that both plungers release from both pull down studs. The plungers can further include a sealing gasket 602 to reduce contaminants entering the internal portions of the system.

In addition, the plungers can include an elongated configuration to control the spacing between the transversely spaced pull down studs. In this respect, the plungers cams can include a lateral spacing 610 to allow for a desired lateral stud spacing 612. As is shown, first plunger 540 includes first cam region 560 having first pull down or locking plunger cam 570 and second cam region 562 that includes second pull down or locking plunger cam 572. The first and second cams are laterally spaced from one another by lateral spacing 610. Similarly, second plunger 542 includes first cam region 560 having first pull down or locking plunger cam 570 and second cam region 562 that includes second pull down or locking plunger cam 572. The first and second cams are laterally spaced from one another by lateral spacing 610. However, the lateral spacing 610 of plunger 540 does not need to be the same as lateral spacing 610 for plunger 542. The plunger can further include flat extensions 620 that can also function to prevent rotation of the plunger within the plunger passage(s).

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted nearly as illustrative of the invention and not as a limitation.

It is claimed:

1. A mounting system comprising a base block and at least one plunger arrangement, the base block having a first block surface and a second block surface, the first block surface being configured to support an associated object; the base block further including a plunger passage, a first stud passage and a second stud passage; the plunger passage extending into the base block from the second block surface and extending inwardly along a plunger passage axis, the first and second stud passages extending into the base block from the first block surface along a first stud passage axis and a second stud passage axis respectively, the first and second stud passage axes being generally transverse to the plunger passage axis and radially spaced from the plunger passage axis; the first stud passage partially intersecting the plunger passage forming a first locking region between the plunger passage axis and the first stud passage axis and the second stud passage partially intersecting the plunger passage forming a second locking region between the plunger passage axis and the second stud passage axis; the first and second stud passage axes being axially spaced from one another along the plunger passage axis wherein the first and second locking regions are axially spaced along the plunger passage axis; the first stud passage being shaped to receive an associated first stud, the associated first stud extending between a first stud inner end and a first stud outer end along a first stud body axis, the associated first stud having an associated first stud cam between the first stud ends; the second stud passage being shaped to receive an associated second stud, the associated second stud extending between a second stud inner end and a second stud outer end along a second stud body axis, the associated second stud having an associated second stud cam between the second stud ends; the at least one plunger arrangement including a first plunger, a second plunger and a plunger rod; at least a first part of the plunger passage being shaped to receive the first plunger in a sliding relationship allowing the first plunger to slide axially in the plunger passage axially along the plunger passage axis; and at least a second part of the plunger passage being shaped to receive the second plunger in a sliding relationship allowing the second plunger to slide axially in the plunger passage axially along the plunger passage axis; the first plunger including a first inner end, a first outer end and a first plunger rod opening; the second plunger including a second inner end, a second outer end and a second plunger rod opening; the first inner end facing the second inner end; the plunger rod extending along the plunger axis and having a first plunger rod end and a second plunger rod end; the plunger rod extending through the first and second plunger rod openings and including a threaded rod portion and a tool receiving portion; at least one of the first and second plungers being operably joined relative to the threaded rod portion wherein rotation of the plunger rod in a first direction moves the first and second plungers towards one another and rotation of the plunger rod in a second direction moves the first and second plungers away from one another; the first plunger having a first plunger side locking cam between the first inner end and the first outer end; the second plunger having a second plunger side locking cam between the second inner end and the second outer end; the first and second plungers being axially positionable by the rotation of the plunger rod between an unlocked position and a locked position along the plunger passage axis; when the plunger is in the unlocked position at least the first and second plunger side locking cams are at least partially axially spaced along the plunger axis from the first and second stud passages respectively allowing the associated first and second studs to enter the first and second locking regions respectively; rotation of the plunger rod moving the first and second plungers of the plunger arrangement toward one another and toward the locked position and moving the first and second plungers relative to one another wherein the first plunger side locking cam lockingly engages the associated first stud cam and the second plunger side locking cam lockingly engages the associated second stud cam; the at least one plunger arrangement being configured to selectively axially float relative to the base block along the plunger axis to allow the first and second plungers to automatically align relative to the associated first and second studs when moving toward the locked position.

2. The mounting system according to claim 1, wherein the selectively axially float of the plunger arrangement is limited axial float.

3. The mounting system according to claim 2, further including at least one limit pin configured to selectively engage the plunger arrangement to produce the limited axial float.

4. The mounting system according to claim 1, wherein the base block further includes a third block surface that is opposite of the second block surface, the plunger passage including a first plunger pocket extending inwardly from the third block surface and a second plunger pocket extending inwardly from the second block surface, the plunger passage further including a plunger rod passage between the first and second plunger pockets; the first plunger pocket being shaped to receive the first plunger and the second plunger pocket being shaped to receive the second plunger, the plunger rod passage being smaller than the first and second plunger pockets and shaped to receive the plunger rod.

5. The mounting system according to claim 4, further including at least one limit pin configured to selectively engage the plunger arrangement to produce limited axial float of the at least one plunger arrangement.

6. The mounting system according to claim 1, further including at least one limit pin configured to selectively engage the plunger arrangement to limit axial float of plunger rod.

7. The mounting system according to claim 1, wherein the plunger rod of the at least one plunger arrangement is at least partially axially floatable within the plunger passage along the plunger axis to allow for equalized force being applied to the associated first and second studs to balance stud hold down forces produced by the at least one plunger arrangement.

8. The mounting system according to claim 7, wherein the axially floatable plunger arrangement is limited.

9. The mounting system according to claim 8, further including at least one limit pin configured to selectively engage the plunger arrangement to produce the limited axial float.

10. The mounting system according to claim 1, wherein the threaded rod portion is a first threaded rod portion, the plunger rod further including a second threaded rod portion, the first threaded rod portion having a clockwise thread and the second threaded rod portion having a counterclockwise thread; the first plunger rod opening includes a clockwise opening thread shaped to threadingly engage the first threaded rod portion and the second plunger rod opening includes a counterclockwise opening thread shaped to threadingly engage the second threaded rod portion.

11. The mounting system according to claim 1, wherein the at least one of the first and second plungers includes a threaded plunger rod opening and the other of the at least one of the first and second plungers includes a rod engaging surface or edge that urges the other of the at least one of the first and second plungers when the threaded rod is rotated in the first direction, the plunger arrangement further including at least one spring wherein the at least one spring helps urge the first and second plungers axially when the threaded rod is rotated in the second direction.

12. The mounting system according to claim 1, wherein the base block further includes a third block surface that is opposite of the second block surface; the plunger passage includes a first plunger pocket extending inwardly form the third block surface and a second plunger pocket extending inwardly from the second block surface, the plunger passage further including a plunger rod passage between the first and second plunger pockets; the plunger rod passage being shaped to receive the plunger rod; the first plunger pocket being shaped to receive the first plunger and having a first inner wall between the first plunger pocket and one side of the plunger rod passage, the second plunger pocket being shaped to receive the second plunger and having a second inner wall between the second plunger pocket and the other side of the plunger rod passage.

13. The mounting system according to claim 12, wherein the first plunger pocket includes a first passage flat surface and the second plunger pocket includes a second passage flat surface, the first plunger includes a first plunger flat section and the second plunger including a second flat section, the first passage flat surface aligning with the first plunger flat section and allows axial movement along the plunger axis while at least partially preventing rotation of the first plunger about the plunger axis within the first plunger pocket, the second passage flat surface aligning with the second plunger flat section and allows axial movement along the plunger axis while at least partially preventing rotation of the second plunger about the plunger axis within the second plunger pocket.

14. The mounting system according to claim 12, wherein the plunger rod, the first plunger and the second plunger are coaxial with the plunger axis.

* * * * *